US012208985B2

(12) United States Patent
Cobler

(10) Patent No.: US 12,208,985 B2
(45) **Date of Patent: *Jan. 28, 2025**

(54) APPARATUS AND METHOD FOR PRINTING ONTO A POLYMERIC WEB

(71) Applicant: Poly-America, L.P., Grand Prairie, TX (US)

(72) Inventor: Brad A. Cobler, Irving, TX (US)

(73) Assignee: Poly-America, L.P., Grand Prairie, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,018

(22) Filed: Sep. 5, 2023

(65) Prior Publication Data

US 2023/0406666 A1 Dec. 21, 2023

Related U.S. Application Data

(63) Continuation of application No. 17/825,740, filed on May 26, 2022, now Pat. No. 11,780,700.

(51) Int. Cl.

| | |
|---|---|
| ***B65H 37/06*** | (2006.01) |
| ***B41J 3/407*** | (2006.01) |
| ***B41J 15/16*** | (2006.01) |
| ***B65B 61/02*** | (2006.01) |
| ***B65H 26/02*** | (2006.01) |
| ***B65H 45/00*** | (2006.01) |
| ***B65H 45/08*** | (2006.01) |
| ***B65H 45/22*** | (2006.01) |
| *B65B 9/06* | (2012.01) |
| *B65H 23/025* | (2006.01) |

(52) U.S. Cl.

CPC .............. *B65H 37/06* (2013.01); *B41J 3/407* (2013.01); *B41J 15/16* (2013.01); *B65B 61/025* (2013.01); *B65H 26/025* (2013.01); *B65H 45/00* (2013.01); *B65H 45/08* (2013.01); *B65H 45/221* (2013.01); *B41J 15/165* (2013.01); *B65B 9/06* (2013.01); *B65H 23/025* (2013.01); *B65H 2701/191* (2013.01)

(58) Field of Classification Search

CPC ...... B65H 37/06; B65H 26/025; B65H 45/00; B65H 45/08; B65H 45/221; B65H 23/025; B65H 2701/191; B41J 3/407; B41J 15/16; B41J 15/165; B65B 61/025; B65B 9/06

See application file for complete search history.

(56) References Cited

U.S. PATENT DOCUMENTS 11,780,700 B1 * 10/2023 Cobler ................. B65H 45/221 101/178

* cited by examiner

*Primary Examiner* — Henok D Legesse
(74) *Attorney, Agent, or Firm* — Daniel J. Layden

(57) ABSTRACT

The present invention is directed to a method and apparatus for securely applying print to a web of continuous polymeric film. The web can first travel in a machine direction on a tensioning roller and onto a folding board whereupon the web is divided into first and second partial widths with a cross-section of the web taking on a U-shape or a V-shape. In between the cross-section of these two partial widths a printer can be placed such that the printer prints onto an inner surface of first partial width. Once the printing is complete, the folding of the web can be completed such that an inner surface of the second partial width is in contact with, covers, and protects the printed matter placed onto the first partial width.

20 Claims, 4 Drawing Sheets

APPARATUS AND METHOD FOR PRINTING ONTO A POLYMERIC WEB

CROSS-REFERENCE TO RELATED APPLICATIONS

Figure 1A:
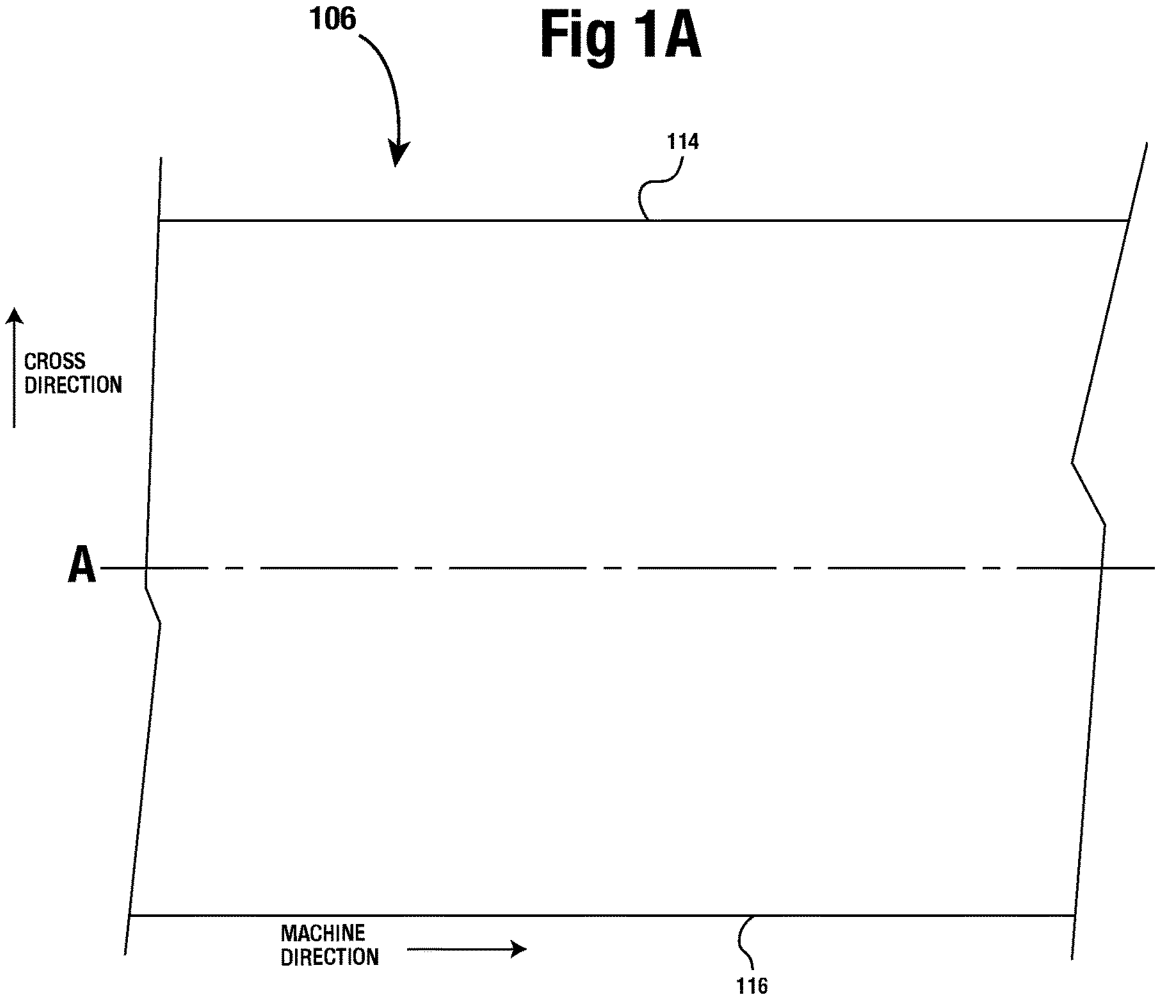

This application is a continuation of U.S. application Ser. No. 17/825,740, filed May 26, 2022, and is hereby incorporated by reference into this disclosure in its entirety.

BACKGROUND OF THE INVENTION

1. Field of the Invention

The present invention relates to improvements for printing onto a continuous web of polymeric film. In particular, it relates to improvements for printing onto a web of polymeric film when utilizing thermal wax printing.

2. Description of the Related Art

Thermoplastic films are used in a variety of applications. For example, thermoplastic films are used in sheet form for applications such as drop cloths, vapor barriers, and protective covers. Thermoplastic films can also be converted into plastic bags, which may be used in a myriad of applications.

Polymeric bags are ubiquitous in modern society and are available in countless combinations of varying capacities, thicknesses, dimensions and colors. The bags are available for numerous applications including typical consumer applications such as long-term storage, food storage, and trash collection.

Polymeric bags are manufactured from polymeric film produced using one of several manufacturing techniques well-known in the art. The two most common methods for manufacture of polymeric films are blown-film extrusion and cast-film extrusion. In blown-film extrusion the resulting film is tubular while cast-film extrusion produces a generally planar film. Regardless of the manufacturing method utilized, the present invention is generally applicable to a continuous web of plastic film that is being converted into various forms of bags.

In blown film extrusion, polymeric resin is fed into an extruder where an extrusion screw pushes the resin through the extruder. The extrusion screw compresses the resin, heating the resin into a molten state under high pressure. The molten, pressurized resin is fed through a blown film extrusion die having an annular opening. As the molten material is pushed into and through the extrusion die, a polymeric film tube emerges from the outlet of the extrusion die.

The polymeric film tube is blown or expanded to a larger diameter by providing a volume of air within the interior of the polymeric film tube. The combination of the volume of air and the polymeric film tube is commonly referred to as a bubble between the extrusion die and a set of nip rollers. As the polymeric film tube cools travelling upward toward the nip rollers, the polymeric film tube solidifies from a molten state to a solid state after it expands to its final diameter and thickness. Once the polymeric film tube is completely solidified, it passes through the set of nip rollers and is collapsed into a collapsed polymeric tube, also referred to as a collapsed bubble.

Two common types of trash bags are side sealed drawstring trash bags and bottom sealed wave-cut trash bags. Manufacturing methods for the production of drawstring bags from a collapsed tube of material are shown in numerous prior art references including, but not limited to, U.S. Pat. Nos. 3,196,757 and 4,624,654, which are hereby incorporated by reference.

A wave-cut trash bag has a wave or lobe-shaped configuration at its open end. This provides two or more lobes, which can be used to tie the trash bag in a closed configuration after it is filled. Wave-cut trash bags can be manufactured by providing closely spaced, parallel transversely extending seals at predetermined intervals along the collapsed polymeric tube. A transversely extending line of perforations is provided between the closely spaced, parallel seals. The collapsed polymeric tube is then separated longitudinally along a wave or lobe-shaped line located equidistant between the edges of the tube.

The lobe-shaped features, or lobes, of a wave-cut trash bags, which may also be referred to as tie-flaps, provide a convenient user feature to tie and close the opening of the bag. The lobes are grasped and knotted to seal the bag opening. Representatives of wave-cut or "tie bags" can be found in the following prior art of U.S. Pat. Nos. 4,890,736, 5,041,317, 5,246,110, 5,683,340, 5,611,627, 5,709,641, and 6,565,794, which are hereby incorporated by reference.

A manufacture may desire to apply printed content onto a continuous web of polymeric film during a bag conversion process. Among various printing technologies, thermal wax printing can be utilized for this purpose. However, in contrast to more commonly used ink jet printing technology, thermal wax printing has at least one particular disadvantage under these circumstances. In a high speed conversion process, the thermal wax printing does not adhere to various polymeric films, such as polyethylene films, as well as various inks used in typical commercial ink jet printing processes. The thermal wax print can migrate to downstream converting machinery that it comes into contact with, which can degrade the effectiveness of the machinery. Furthermore, the thermal wax ink can migrate back onto the polymeric web from said downstream converting machinery, which can result in the printed matter on the continuous web of polymeric becoming obscured and illegible.

In view of the considerations discussed above, the invention disclosed herein is particularly advantageous to protect print placed onto a polymeric web using thermal wax printing. The following disclosure addresses the invention in detail.

SUMMARY OF THE INVENTION

The present invention comprises a method for securely printing onto a continuous web of polymeric film. As part of the method, the continuous web can travel in a machine direction and the web can comprise first and second edges at opposite ends along a cross direction of the web, with the cross direction perpendicular to the machine direction. Located in front of a folding board can be a first tensioning roller. The first tensioning roller can transfer the web onto the folding board and the folding board can fold the web. The folding can form a crease into the web in the machine direction prior to completion of the folding. The folding can further define a first partial width of the web extending from the crease to the first edge of the web. The folding can also define a second partial width of the web extending from the crease to the second edge of the web.

The method can further comprise locating a print head or printer between the first and second partial widths of the web. The print head can place printed matter onto an interior surface of the first partial width at a print location on the web. Once the printed matter is placed on the first partial width, the folding board can collapse the folded web such that an interior surface of the second partial width is in at least partial contact with the interior surface of the first partial width. Additionally, the method can comprise the upper surface of the second partial width contacting and covering up the print location once the folding is completed.

In certain embodiments of the present invention, the printing method can further comprise the folding board forming a cross-section with a V-shape into the web. The first and second partial widths of the web can correspond to first and second legs of the V-shape and the crease can correspond to an apex of the V-shape. Furthermore, the print head can be located within the V-shape and the first and second partial widths can equal an entire width of the web in the cross direction. The web can also be generally flat without any folds in the web prior to the web transferring to the folding board. Additionally, a centerline of the web can be aligned with the crease in the web, or the centerline cannot be aligned with the crease in the web. In certain embodiments, the web can comprise more than a single layer; it can also comprise four or more layers of film. Additionally, the continuous web can transfer from the folding board to a set of post folding rollers once the folding is complete. Moreover, the printed matter of the present invention can comprise thermal wax print.

The present invention can further comprise an apparatus for securely printing onto a continuous web. The apparatus can comprise a first tensioning roller for maintaining tension on the web travelling in a machine direction. The continuous web can comprise an upper surface and a lower surface. The web can further comprise first and second edges at opposite ends of the web along a cross direction, where the cross direction is perpendicular to the machine direction. A folding board can be located downstream of the machine direction from the first tensioning roller and the continuous web can transition from the first tensioning roller to the folding board. The folding board can fold the continuous web and the folding can form a crease into the web. A first partial width can be defined in the continuous web that extends from the crease to the first edge of the continuous web and a second partial width can be defined in the continuous web that extends from the crease to the second edge of the continuous web.

The apparatus for securely printing onto a continuous web can further comprise a print head located between the first and second partial widths of the web. The print head can print onto the first partial width of the web at a print location. Once the printing is complete, the folding board can collapse the folded web such that the upper surfaces of the first and second partial widths are at least in partial contact with each other such that the upper surface of the second partial width contacts the print location and protects the printed matter at the print location by covering it up.

In certain embodiments of the present invention, the printing apparatus can further comprise the folding board having a V-shape such that the folding board forms a V-shaped cross-section into the web. The first and second partial widths of the continuous web can correspond to first and second legs of the V-shape. Furthermore, the crease in the continuous web can correspond to an apex of the V-shaped folding board and the first and second partial widths can equal an entire width of the web in the cross direction. In addition, a centerline of the continuous web can be aligned with the crease in the web or the centerline of the web cannot be aligned with the crease in the web. In certain embodiments, the continuous web can comprise more than a single layer of film and it can even comprise four or more layers of film. Once the continuous web is completely collapsed, the continuous web can also transfer the folding board to a set of post folding rollers. Furthermore, the printed matter can comprise thermal wax print.

It is contemplated that the present invention may be utilized in ways that are not fully described or set forth herein. The present invention is intended to encompass these additional uses to the extent such uses are not contradicted by the appended claims. Therefore, the present invention should be given the broadest reasonable interpretation in view of the present disclosure, the accompanying figures, and the appended claims.

BRIEF DESCRIPTION OF THE RELATED DRAWINGS

A full and complete understanding of the present invention may be obtained by reference to the detailed description of the present invention and certain embodiments when viewed with reference to the accompanying drawings. The drawings can be briefly described as follows.

FIG. 1A provides a plan view of a continuous web 106 of polymeric film.

Figure 1B:
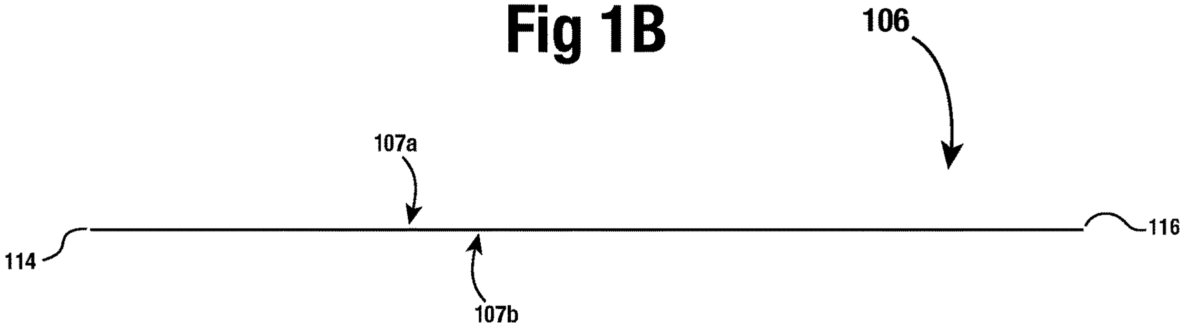

FIG. 1B provides a cross-sectional view of the continuous web 106 of FIG. 1A, the polymeric film having nominal thickness.

Figure 2:
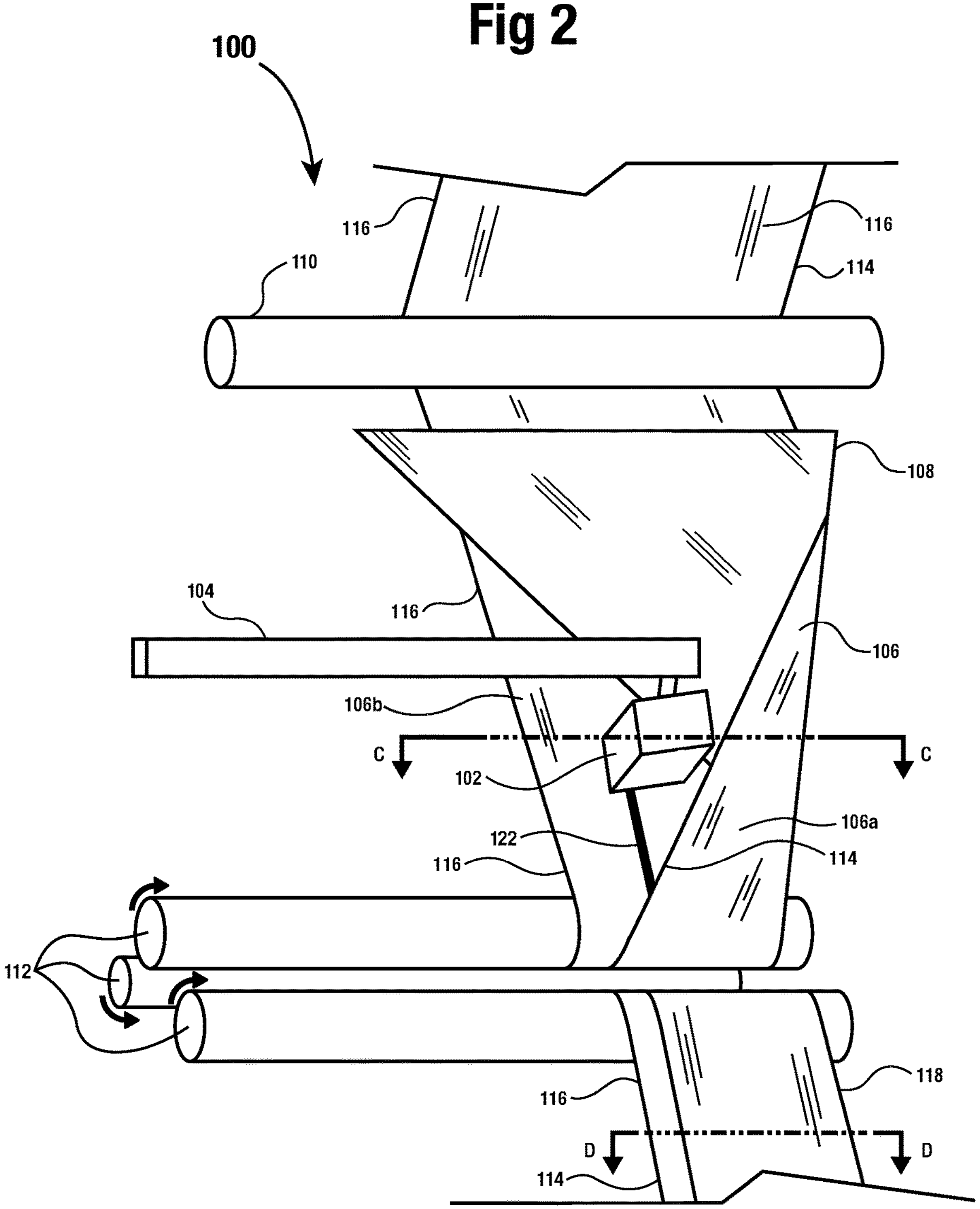

FIG. 2 provides a front perspective view of a web printing system 100.

Figure 3:
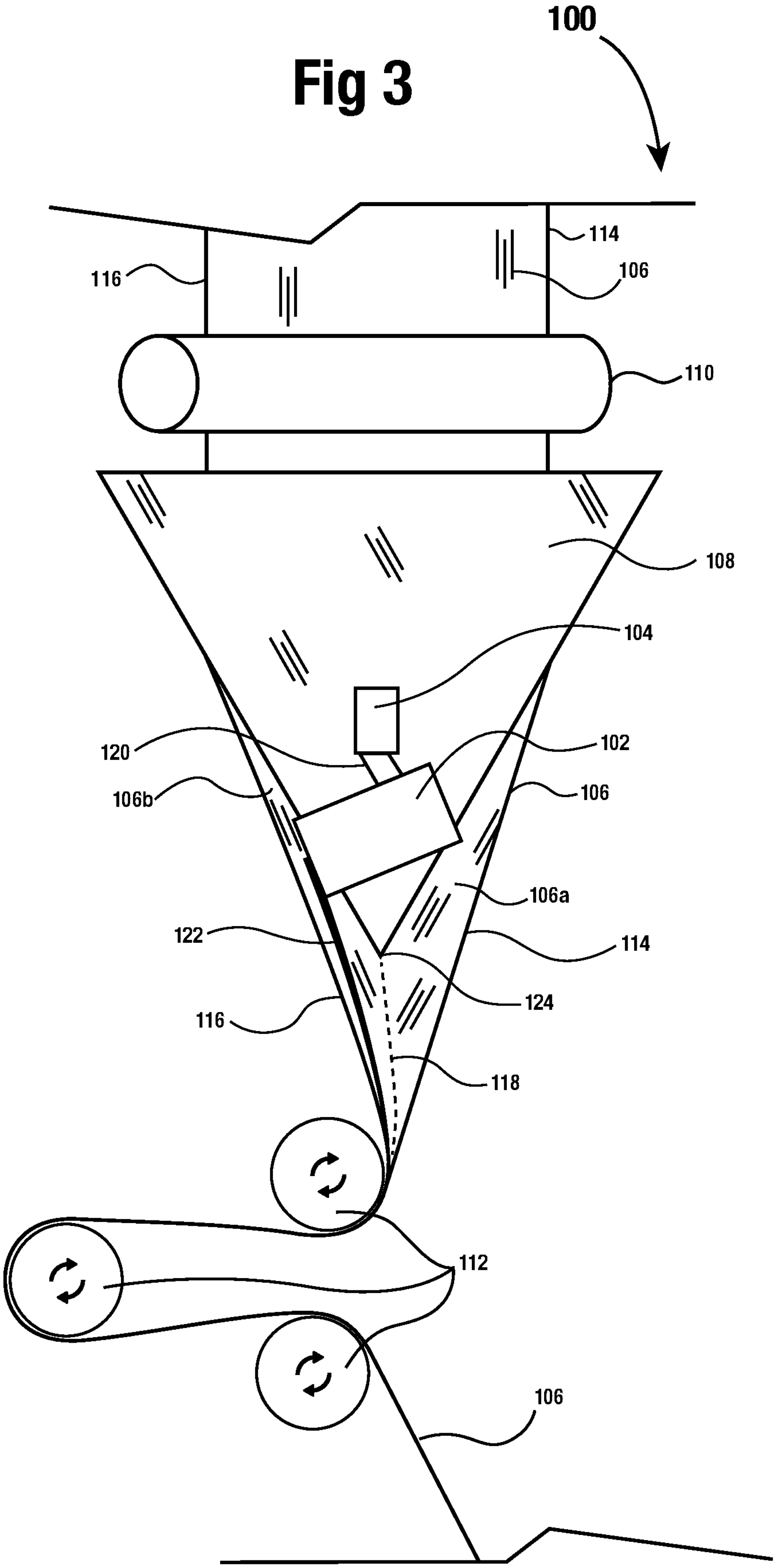

FIG. 3 provides a side perspective view of web printing system 100 of FIG. 2.

Figure 4A:
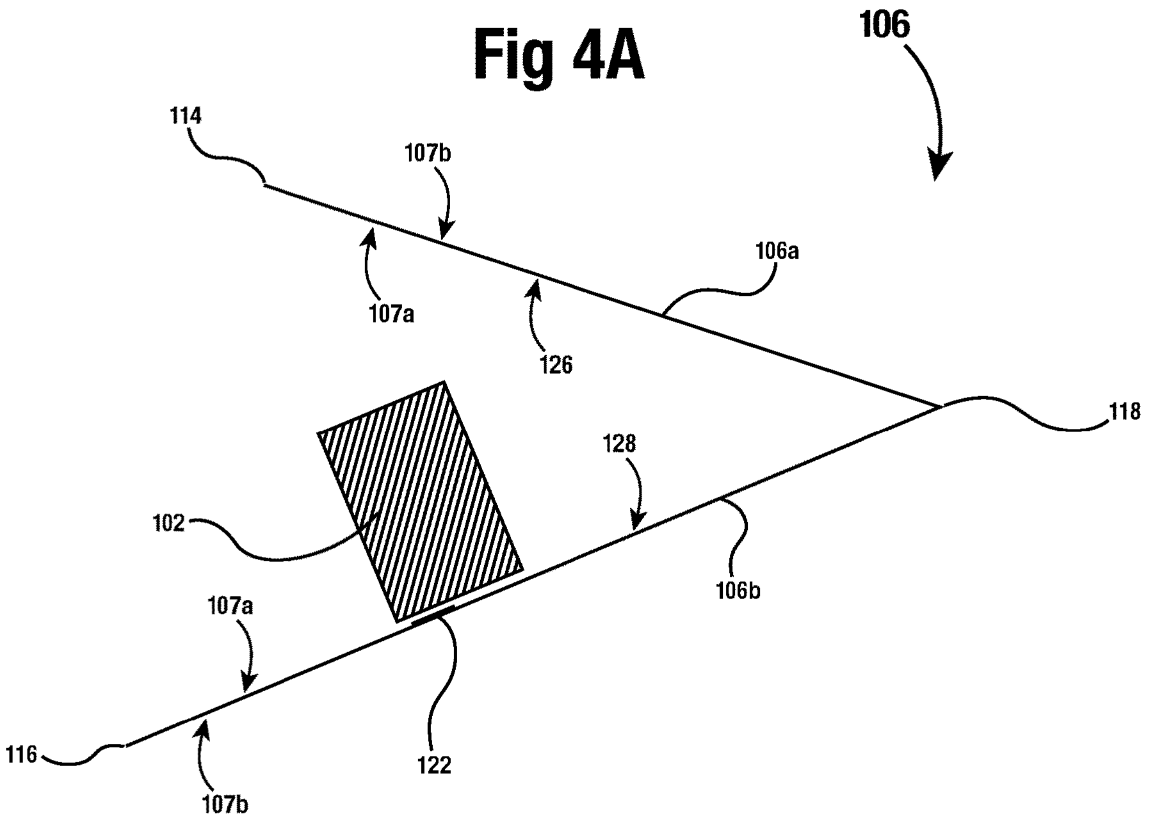

FIG. 4A provides a cross-sectional view of web 106 and a printer 102 of web printing system 100 of FIG. 2 taken from cutting plane C-C. Folding board 108 is not shown in the figure for ease of illustration.

Figure 4B:
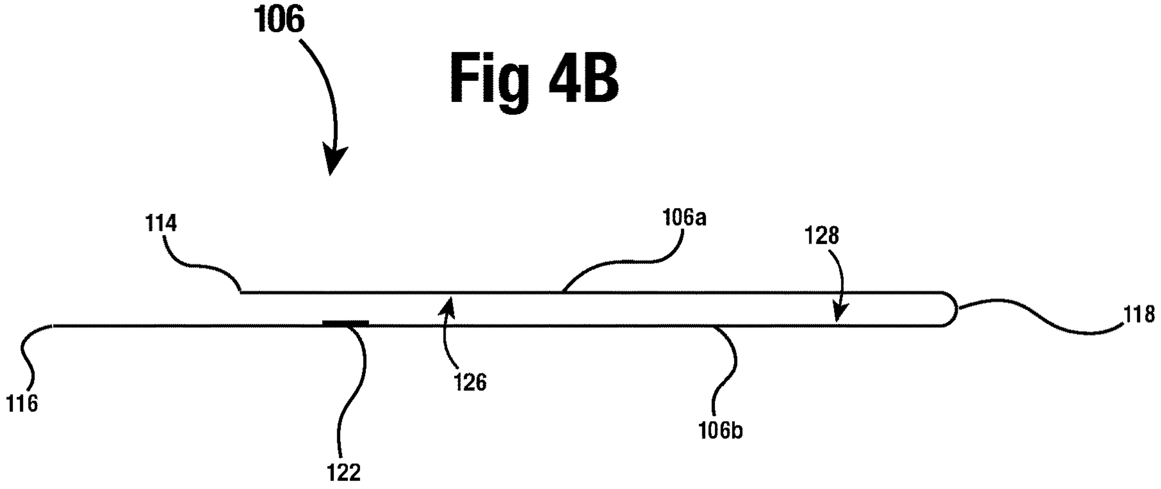

FIG. 4B provides a cross-sectional view of web 106 of the web printing system 100 of FIG. 2 taken from cutting plane D-D.

DETAILED DESCRIPTION OF THE INVENTION

The present disclosure illustrates several embodiments of the present invention. It is not intended to provide an illustration or encompass all embodiments contemplated by the present invention. In view of the disclosure of the present invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. The appended claims are intended to more fully and accurately encompass the invention to the fullest extent possible, but it is fully appreciated that certain limitations on the use of particular terms are not intended to conclusively limit the scope of protection.

Referring initially to FIGS. 1 and 2, plan and cross-sectional views of a continuous web of polymeric film 106 is disclosed. Because web 106 is of nominal thickness, its thickness is shown merely by a single line in the drawings. In certain embodiments, web 106 can comprise a single layer and in further embodiments web 106 can comprise multiple layers of polymeric film. Web 106 can also comprise a collapsed tube of polymeric film formed via a blown film extrusion process. Although not shown, web 106 may also comprise a C-folded polymeric film formed from a slit collapsed tube of polymeric film as known in the art. In further embodiments, web 106 can comprise a web which has undergone a certain amount of steps of being converted into polymeric bags, such as side-sealed drawstring trash bags or wave-cut bottom sealed trash bags.

In certain embodiments, web 106 can be formed from various classes of polyethylene polymers, such as low density polyethylene (LDPE), linear low density polyethylene (LLPDE), and high density polyethylene (HDPE). However, various other types of polymers may be used to form web 106, such as various types of nylon, PET, and polypropylene.

As further shown in FIGS. 1A and 1B, continuous web 106 can have first and second edges 114 and 116 defined at opposite edges along a cross direction of web 106. Also shown by FIG. 1A, centerline A can extend along a machine direction of web 106. As mentioned above, in certain embodiments of the present invention, continuous web 106 can be C-folded. In addition, the C-folded web can have each side of the C-fold hemmed such that a partial width along each edge 114 and 116 of web 106 comprises four layers of film. As further shown by FIG. 1B, web 106 can also have an upper surface 107*a* and a lower surface 107*b*.

Now turning to FIGS. 2 and 3, front and side perspective views of a first embodiment of the present invention, web printing system or apparatus 100, is disclosed. As shown in the figures, web printing system 100 can include a printer or print head 102 with a printer frame 104 holding printer 102 in place adjacent to a folding board 108. Web printing system 100 can further include a pre-printing tensioning roller 110 located in front of or upstream of folding board 108 and printer 102. Downstream from folding board 108 and on an opposite side of printer 102 from first tensioning roller 110 can be a set of post folding rollers 112.

In certain embodiments of the present invention and as shown in FIGS. 2 and 3, folding board 108 can be a V-shaped folding board. As shown in the figures, V-shaped folding board 108 can have an apex 124 at the intersection of the two legs of the V-shape. Continuous web 106, traveling in the machine direction, in at least certain embodiments, can pass onto folding board 108 after moving from pre-printing tensioning roller 110.

As continuous web 106 passes over folding board 108, a cross section of web 106 can be formed into a V-shape by board 108 so that first and second partial widths 106*a* and 106*b* of web 106 correspond to first and second legs of a V-shape, as shown by FIG. 4A. Additionally, a crease 118 can be formed in web 106 due to the web passing over apex 124 of board 108.

As further shown by FIGS. 4A and 4B, first partial width 106*a* can extend from first edge 114 to crease 118. Additionally, second partial width 106*b* can extend from second edge 116 to crease 118 of web 106. Furthermore, as shown by FIG. 4A, first partial width 106*a* can have an interior surface 126 and second partial width 106*b* can have an interior surface 128 located within the V-shape. Web 106 can be folded such that upper surface 107*a* of web 106 corresponds to inner surfaces 126 and 128 and outer surface 107*b* corresponds to the outer side of the V-shape.

In certain embodiments, the V-shaped cross section in web 106 can be formed such that apex 124 of the V-shape folding board 108 is centered between the first and second edges 114 and 116 of web 106 at centerline A as shown in FIG. 1A. In further embodiments, as shown in FIGS. 4A and 4B, web 106 can be placed off-center of apex 124 so that the V-shaped cross-section is offset from centerline A of web 106.

As best shown by FIG. 4B, when centerline A of web 106 is placed off-center of apex 124, partial widths 106*a* and 106*b* of web 106 are offset from each other once folding of web 106 is complete. This off-centering of web 106 also results in first and second edges 114 and 116 of web 106 being separated from each other once the folding of web 106 is complete. In contrast to this result, if centerline A is aligned with apex 124 of folding board 108, first and second edges are aligned with and proximate to each other once the folding of web 106 is complete.

Printer 102 can be located along the web at the point where V-shaped cross-section is formed in web 106, in between first and second partial widths 106*a* and 106*b* and adjacent to upper surface 107*a*, as depicted in FIGS. 2, 3 and 4A. In at least certain embodiments, printer 102 can be proximate to the interior surface 128 of second partial width 106*b*. Furthermore, at least in certain embodiments, printer can be an inkjet printer or a thermal wax printer. Printer 102 can be oriented such that printer's 102 ink stream is generally perpendicular to interior surface 128 of second partial width 106*b*. As web 106 passes printer 102, printed matter 122 can be placed onto interior surface 128 of web 106 from printer 102.

Once printed matter 122 is applied to web 106, web 106 can fully transition off of folding board 108 and move towards post-folding rollers 112. FIG. 4B shows a cross section of web 106 taken from cutting plane D-D of FIG. 2 once folding board 108 has completely folded web 106. FIG. 4B illustrates a gap between partial widths 106*a* and 106*b*; however, this is merely for ease of illustration. It is contemplated for thin polymeric films as utilized with the invention, that the surfaces of partial widths 106*a* and 106*b* will be substantially in contact with each other.

As mentioned above, FIG. 4B shows web 106 once folding of web 106 is complete. FIG. 4B further shows that interior surfaces 126 and 128 of partial widths 106*a* and 106*b* are brought towards each after folding other such that inner surfaces 126 and 128 are at least in partial contact with each other. Furthermore, with upper surface 107*a* spanning the width of web 106, partial width 106*a* of upper surface 107*a* is placed into at least partial contact with partial width 106*b* of upper surface 107*a* when web 106 is completely folded.

As addressed above and illustrated by FIGS. 4A and 4B, web 106 can be placed on folding board 108 off-center such that fold 118 is not centered in the cross direction of web 106. As a result, partial widths 106*a* and 106*b* are unequal such that second edge 116 of web 106 extends past first edge 114 once folding is complete. Once folding of web 106 is completed, print matter location 122 on interior surface 128 of second partial width 106*b* can be covered by and in contact with the interior surface 126 of first partial width 106*a*.

Partial width 106*a* covering printed matter 122 can be advantageous as web 106 undergoes further processing, especially when printer matter 122 comprises thermal wax print. Applicant has identified that when thermal wax printed matter 122 is not covered by the folded web 106, a certain amount of the printed matter 122 can detach from web 106 and onto downstream converting mechanisms, such as post-folding rollers 112. The buildup on such rollers can then detach from the rollers and mark over subsequent printed matter 122 on continuous web 106. Eventually, the buildup can interfere with the advancement of web 106 past post-folding rollers 112. The covering of printed matter 122 on second partial width 106*b* by first partial width 106*a* protects printed matter 122 and keeps printed matter 122 from being obscured and detaching from print location 122 and attaching onto processing equipment such as post-folding rollers 112.

The specific embodiments depicted herein are not intended to limit the scope of the present invention. Indeed, it is contemplated that any number of different embodiments may be utilized without diverging from the spirit of the invention. Therefore, the appended claims are intended to more fully encompass the full scope of the present invention.

What is claimed is:

1. A method for securely applying print to a web of continuous polymeric film extending in a machine direction, the method comprising:

a folding board folding the web, the folding forming a crease into the web, the crease extending in the machine direction, the folding defining a first partial width of the web extending from the crease to a first edge of the web and a second partial width of the web extending from the crease to an opposite second edge of the web, a print head placing printed matter onto an interior surface of the first partial width at a print location, the folding board collapsing the folded web such that an interior surface of the second partial width is in at least in partial contact with the interior surface of the first partial width, and the second partial width contacting the print location.

2. The method of claim 1, further comprising:

the folding board forming a V-shaped cross-section into the web, the first and second partial widths of the web corresponding to first and second legs of the V-shape and the crease corresponding to an apex of the V-shape, and the print head located within the V-shape.

3. The method of claim 2 further compromising:

the first and second partial widths equaling an entire width of the web.

4. The method of claim 2 further comprising:

the web transferring from the folding board to a set of post folding rollers once the folding is complete.

5. The method of claim 1 further comprising:

the web generally flat without any folds in the web prior to the folding board folding the web.

6. The method of claim 1 further comprising:

a centerline of the web aligned with the crease in the web.

7. The method of claim 1 further comprising:

a centerline of the web not aligned with the crease in the web resulting in the first and second edges of the web offset from each other in a cross direction once the folded web is collapsed, the cross direction perpendicular to the machine direction.

8. The method of claim 1 further comprising:

the web comprising more than a single layer of film.

9. The method of claim 8 further comprising:

the web comprising four layers of film.

10. The method of claim 1 further comprising:

the printed matter comprising thermal wax print.

11. An apparatus for securely applying print to a web of continuous polymeric film extending in a machine direction, the apparatus comprising:

a folding board that folds the web, the web having upper and lower surfaces, wherein the folding board forms a crease into the web to define a first partial width in the web extending from the crease to a first edge of the web and a second partial width in the web extending from the crease to a second opposing edge of the web, and a print head applying print onto the upper surface of the first partial width of the web, the print applied to the web at a print location, wherein once the printing is complete, the folding board collapses the folded web such that the upper surfaces of the first and second partial widths are at least in partial contact with each other such that the upper surface of the second partial width contacts the print location.

12. The apparatus of claim 11 wherein:

the folding board comprises a V-shape such that the folding board forms a V-shaped cross-section into the web and the first and second partial widths of the web correspond to first and second legs of the V-shape.

13. The apparatus of claim 12 wherein:

the crease in the web corresponds to an apex of the V-shape folding board.

14. The apparatus of claim 13 wherein:

the first and second partial widths equal an entire width of the web in a cross direction, the cross direction perpendicular to the machine direction.

15. The apparatus of claim 14 wherein:

a centerline of the web is aligned with the crease in the web.

16. The apparatus of claim 14 wherein:

a centerline of the web is not aligned with the crease in the web such that the first and second edges of the web are offset from each other once the folded web is collapsed.

17. The apparatus of claim 11 wherein:

the web comprises more than a single layer of film.

18. The apparatus of claim 17 wherein:

the web comprises four layers of film.

19. The apparatus of claim 11 wherein:

the web transfers from the folding board to a set of post folding rollers.

20. The apparatus of claim 11 wherein:

the print comprises thermal wax print.

* * * * *